Patented July 29, 1941

2,250,958

UNITED STATES PATENT OFFICE 2,250,958

PROCESS OF EMBEDDING COLOR IN POLYMERIC MATERIALS

Carl T. Kautter and Kurt Feuerstein, Darmstadt, Germany, assignors to Röhm & Haas Company, Philadelphia, Pa.

No Drawing. Application January 19, 1939, Serial No. 251,691. In Germany January 19, 1938

5 Claims. (Cl. 18—58)

This invention relates to a process for embedding thin layers of colored material just below the surface of sheets or other articles made by polymerizing liquid polymerizable organic compounds. It relates more particularly to preparing sheets of polymeric material such as polymethylmethacrylate which have a colored design or layer just below the surface.

As is well known, various materials which contain the

group in the monomeric form can be polymerized to clear, colorless sheets or other objects. The object of this invention is to provide a method whereby such articles may be decorated or colored in a very simple manner, and in such a way that a design or a continuous layer of colored material is completely embedded within the polymer just below the surface.

It has been found that if a colored material, such as a paint, or suspension of pigment or solution of color in a suitable medium is applied to the surface of a mold and the latter filled with a polymerizable material which is then subjected to polymerizing influences, the colored layer adhering to the mold surface will be removed and completely embedded in the solid polymer a slight distance below the surface. In this manner it is possible to embed in the polymer continuous layers, pictures, designs, letters, etc. in various colors.

In general the process is carried out as follows—

Any desired design is applied by brushing or otherwise to the inner surface of a mold, for example, a sheet of glass as in the molds described in U. S. Patent 2,091,615. A polymerizable material such as methylmethacrylate is then placed in the mold. The polymerizable material is advantageously prepolymerized to a rather thick syrup. After filling the mold the material is heated at a low temperature until the polymerization is complete. The article thus formed is then removed from the mold. The design or other colored layer originally on the glass has been completely removed therefrom and is actually embedded below the surface of the polymerized material.

It has been found that many colored materials may be used provided that the binder or vehicle is insoluble in the monomeric or partially polymerized material. Water soluble binders such as are used in water colors, for example casein or albumin or high molecular materials which are soluble in water or alcohol such as gum arabic or mastic and artificial products such as cellulose ethers, polyvinyl alcohol, water soluble derivatives of polymeric carboxylic acids such as the alkali salts of polyacrylic or polymethacrylic acid or their joint polymers with other materials are all suitable vehicles or binders for pigments or dyes, and can be used as described above. Oil paints may also be used provided that the paint is allowed to dry before being brought in contact with the polymerizable material. Fats and waxes such as are used in the manufacture of colored crayons or pencils may also be used as the binder. In some cases it is advantageous to use a colored material containing a volatile solvent and in such cases the solvent should be evaporated before the design is brought in contact with the polymerizable material. The solvent may be water or an organic liquid depending on the nature of the binder. When applying a design with a color containing no volatile solvent, as for example with a wax crayon, it is advantageous to warm the glass or other mold material slightly so as to insure a uniform distribution of the color over the area to which it is applied. For the colors dyestuffs which are soluble in the solvent or pigments of all kinds including luminous pigments, can be employed in the process. In all cases, however, the material used as the binder for the dye or pigment must be insoluble in the material to be polymerized.

After the polymerized article is removed from the mold it can readily be seen that the design which was applied to the surface of the mold has been completely removed and is actually embedded beneath the surface of the finished article. The colored layer is not simply on the surface and therefore does not require any protective coating. The colored layer remains in a plane parallel to the surface of the article and does not show any tendency to deform or diffuse during the polymerization process.

A process for applying designs to molded articles made from artificial resins is known. According to this process a colored layer of resin is applied to the wall of the mold before the latter is filled with the molding powder. In such cases, however, the binder for the color is a resin which is essentially the same as that from which the molding powder is made. In the present invention the colored layer which is applied to the wall of the mold must be insoluble in the material which is to be polymerized. Otherwise, the polymerizable material being liquid, would dissolve the binder and dissipate it along with the color throughout the liquid. Thus it would be impossible to transfer, without distortion, a design from the mold wall to the interior of the polymerized article.

The invention may be illustrated by the following examples but it is not limited to the exact conditions of operation and materials shown as it may be otherwise practiced within the scope of the appended claims.

*Example 1.*—A luminous pigment is dispersed in a 2% aqueous solution of methyl cellulose to form a paste of good covering power. This is then applied to a sheet of glass, for example as letters or a design. The glass plate is then used to prepare a mold by forming a cell with another glass plate according to the method described in U. S. Patent 2,091,615. A partially polymerized methylmethacrylate is then poured into the mold and subjected to polymerizing influences until the polymerization is complete. The polymerization may be carried out by heating the partially polymerized material with which the mold is filled to 30–35° C. for a few hours and then raising the temperature to 75–80° C. and holding it until polymerization is complete. The sheet of polymer having the design embedded in it is then removed from the mold and tempered by heating to 120° C. for a few hours. If desired, plasticizers may be added to the methylmethacrylate before polymerizing. Styrol, vinyl acetate or other polymerizable material which forms fairly rigid polymers may be used in place of the methylmethacrylate. The design is embedded below the surface of the sheet and cannot be removed by any washing process.

*Example 2.*—An aqueous solution of gum arabic is colored with a water-soluble dye and used to paint a design on the wall of a mold. After drying a polymerizable material such as methyl methacrylate, styrol, vinyl acetate, etc. is poured into the mold and polymerized. The design is embedded in the polymer.

*Example 3.*—A thin paste of polyacrylic acid in a mixture of alcohol and water is used as the binder for a luminous pigment. The paste is painted on glass and the glass sheet used in a mold filled with a polymerizable material as described in Example 1.

*Example 4.*—A casein solution containing a soluble dye is used in the manner described in Example 2.

*Example 5.*—An aqueous solution of equal parts of methyl cellulose and gum arabic is used as the binder for a luminous pigment. The solution is painted on glass, a mold prepared and polymerizable material polymerized therein as described in Example 1.

*Example 6.*—A design is drawn on a sheet of glass by means of colored crayons which are made with a wax binder such as the so-called glass marking pencils. The glass is used in making a mold in which methylmethacrylate is polymerized as described in Example 1.

*Example 7.*—A design is painted on a sheet of glass with oil paints, for example artists colors, and allowed to dry. The glass sheet is made up into a mold and partially polymerized methyl methacrylate is poured in and subjected to polymerizing conditions as explained in Example 1. On removal of the polymerized sheet from the mold the design is completely embedded in the polymer a slight distance below the surface.

In place of the polymerizable materials mentioned above others, generally those containing a

group, which form fairly rigid polymers may be used as well as mixtures of any two or more such materials. Examples of suitable polymerizable compounds are ethyl, propyl, isobutyl, ter-butyl, methacrylate, acrylic and methacrylic amides, nitriles, etc. The nitriles are of particular benefit when employed in making joint polymers.

The sheets or other article may be polymerized under the suitable conditions such as by heating, exposing to light or both and the usual catalysts may be employed to accelerate the process.

In place of the glass described in the examples, other materials such as metals may be used in preparing the molds which may be of any desired shape.

The surface of the mold may be flat and highly polished or it may be carved or etched with a design or the design may be sunk into the mold surface and in this manner a colored design in the nature of a bas-relief may be made on a sheet of polymer.

We claim:

1. The process of embedding a layer of colored material within polymeric material which comprises forming on the surface of a mold a dry layer of color material in an organic binder which is insoluble in a polymerizable liquid, filling said mold with said polymerizable liquid, polymerizing said liquid and removing the polymer from the mold.

2. The process of embedding a layer of colored material within polymeric material which comprises forming on the surface of a mold a dry layer of pigment in an organic binder which is insoluble in a polymerizable liquid, filling said mold with said polymerizable liquid, polymerizing said liquid and removing the polymer from the mold.

3. The process of embedding a layer of colored material within polymeric material which comprises applying to the surface of a mold a layer of an oil paint, drying the paint to a film which is insoluble in a polymerizable liquid, filling said mold with said polymerizable liquid, polymerizing said liquid and removing the polymer from the mold.

4. The process of embedding a layer of colored material within polymeric material which comprises forming on the surface of a glass sheet a dry layer of color material in an organic binder which is insoluble in a polymerizable material, forming a mold of which the coated surface of the glass sheet forms an interior wall, filling said mold with said polymerizable liquid, polymerizing said liquid and removing the polymer from the mold.

5. The process of embedding a layer of colored material within polymeric methyl methacrylate which comprises forming on the surface of a glass sheet a dry layer of color material in an organic binder which is insoluble in monomeric methyl methacrylate, forming a mold of which the coated surface of the glass sheet forms an interior wall, filling said mold with a polymerizable methyl methacrylate composition, polymerizing it and removing the polymer from the mold.

CARL T. KAUTTER.
KURT FEUERSTEIN.